US009413819B1

(12) United States Patent
Berg et al.

(10) Patent No.: US 9,413,819 B1
(45) Date of Patent: Aug. 9, 2016

(54) OPERATING SYSTEM INTERFACE IMPLEMENTATION USING NETWORK-ACCESSIBLE SERVICES

(71) Applicant: Amazon Technologies, Inc., Reno, NV (US)

(72) Inventors: Paul William Berg, Seattle, WA (US); Robert Ferguson Stockdale, Amherst, MA (US); Christopher Ted Fischer, Seattle, WA (US); Peter Mirolubov Voutov, San Diego, CA (US); Matti Juhani Oikarinen, Wilmington, MA (US); Anthony John Dillon, Berkshire (GB)

(73) Assignee: Amazon Technologies, Inc., Reno, NV (US)

( * ) Notice: Subject to any disclaimer, the term of this patent is extended or adjusted under 35 U.S.C. 154(b) by 323 days.

(21) Appl. No.: 14/221,884

(22) Filed: Mar. 21, 2014

(51) Int. Cl.
*G06F 15/16* (2006.01)
*H04L 29/08* (2006.01)

(52) U.S. Cl.
CPC .................................. *H04L 67/10* (2013.01)

(58) Field of Classification Search
CPC ....... H04L 67/10; H04L 69/16; H04L 69/161; G06F 9/5016; G06F 9/546; G06F 12/00; G06F 9/4843; G06F 3/06; G06F 3/067; G06F 3/0631; G06F 9/548; G06F 9/465; G06F 9/45558; G06F 9/455; G06F 9/3851; G06F 9/44; G06F 9/04; Y02B 60/142
See application file for complete search history.

(56) References Cited

U.S. PATENT DOCUMENTS

| | | | | |
|---|---|---|---|---|
| 6,292,820 | B1 * | 9/2001 | Korn | G06F 8/76 718/100 |
| 6,769,122 | B1 * | 7/2004 | Daudel | G06F 9/3851 712/E9.053 |
| 6,820,261 | B1 * | 11/2004 | Bloch | G06F 9/4843 717/114 |
| 6,842,901 | B1 * | 1/2005 | Miller | G06F 9/5016 709/226 |
| 7,043,623 | B2 | 5/2006 | Chen et al. | |
| 7,149,855 | B2 | 12/2006 | Chen et al. | |
| 8,549,543 | B2 | 10/2013 | Kharat et al. | |
| 9,152,474 | B2 * | 10/2015 | Singh | G06F 9/526 |
| 2004/0098722 | A1 | 5/2004 | Funaki et al. | |
| 2010/0082816 | A1 * | 4/2010 | Kharat | G06F 9/54 709/226 |

(Continued)

OTHER PUBLICATIONS

Howard Trickey, "APE-The ANSI/POSIX Environment", Nov. 25, 2013, pp. 1-5.

(Continued)

*Primary Examiner* — Moustafa M Meky
*Assistant Examiner* — Kidest Mendaye
(74) *Attorney, Agent, or Firm* — Robert C. Kowert; Meyertons, Hood, Kivlin, Kowert & Goetzel, P.C.

(57) ABSTRACT

Methods and apparatus for operating system interface implementation using network-accessible services are described. A request to execute a particular program at a distributed computing platform implementing a set of operating system interfaces using resources of network-accessible services of a provider network is received. A compute instance of a computing service is selected for executing operations of a thread of the program. Corresponding to the invocation of a particular operating system interface within the program, at least one operation is performed at a particular service. An overall result of execution of the particular program is determined based at least in part of results of the at least one operation.

22 Claims, 7 Drawing Sheets

(56) References Cited

U.S. PATENT DOCUMENTS

| | | | |
|---|---|---|---|
| 2012/0317568 A1* | 12/2012 | Aasheim | G06F 9/45558 718/1 |
| 2013/0074091 A1* | 3/2013 | Xavier | G06F 9/5011 718/104 |
| 2013/0326031 A1* | 12/2013 | Duarte | G06F 9/5011 709/221 |
| 2014/0040220 A1* | 2/2014 | Kimura | G06F 17/30008 707/704 |

OTHER PUBLICATIONS

Rob Pike, et al., "Plan 9 from Bell Labs", Nov. 25, 2013, pp. 1-24.

Wikipedia, "POSIX", Nov. 25, 2013, pp. 1-8.

* cited by examiner

OPERATING SYSTEM INTERFACE IMPLEMENTATION USING NETWORK-ACCESSIBLE SERVICES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each virtual machine may be considered a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

Taken together, the establishment of large-scale distributed computing environments and virtualization technologies theoretically enable very high levels of scalability, availability and data durability for various types of applications. However, in many cases, in order to maximize the benefits obtained from deployment in the large-scale virtualized network environment, applications may have to be re-designed with such distributed architectures in mind, and/or may require configuration by administrators who are well-versed in various advanced features of the distributed environment. Non-trivial programming effort and/or configuration expertise may sometimes be required to enable programs that utilize application programming interfaces of traditional operating systems (originally designed with uniprocessors or relatively small-scale multiprocessors as target execution environments) to work well in large-scale networks employing modern virtualization technologies.

Figure 1:
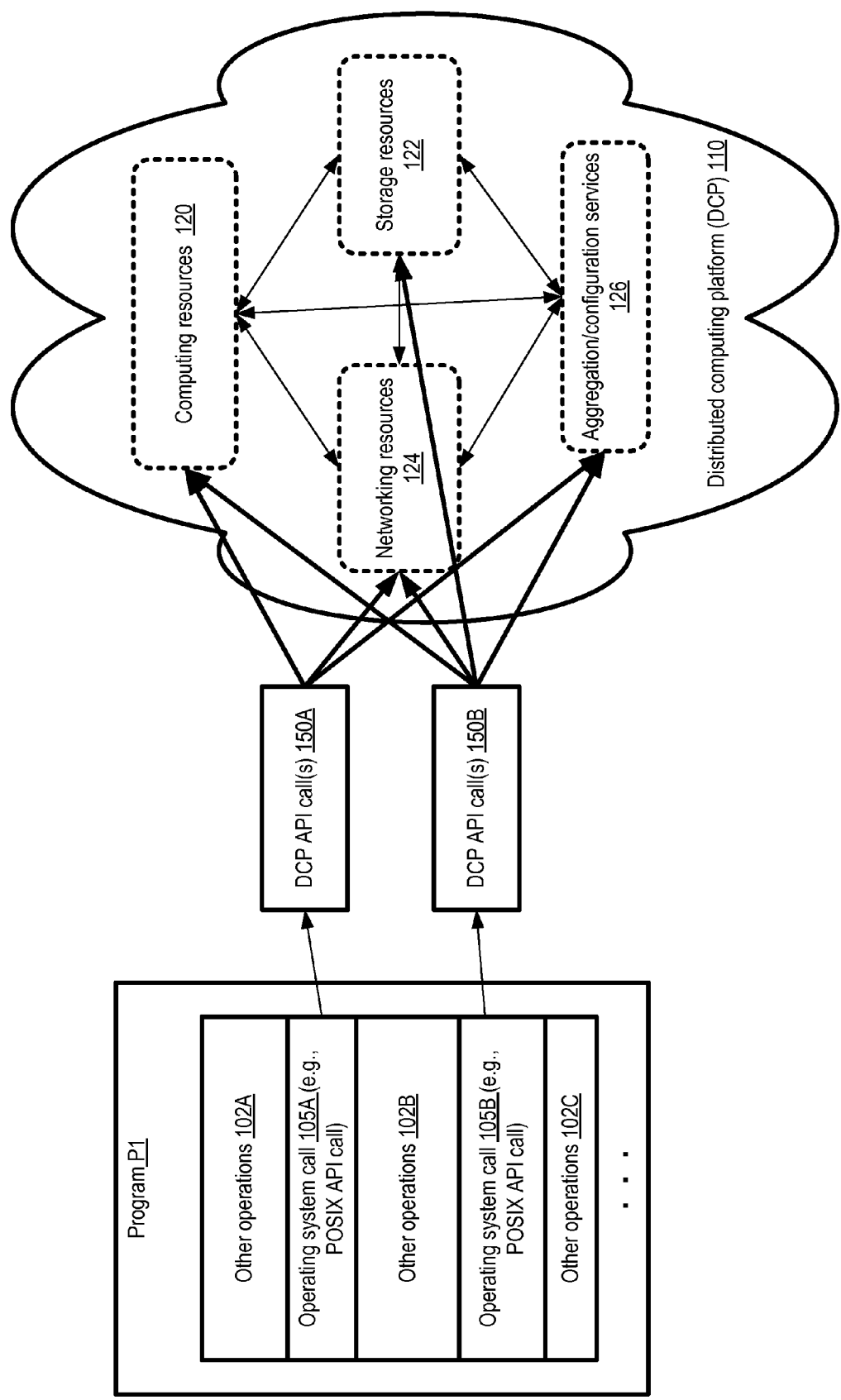
FIG. 1 illustrates the use of resources of a distributed computing platform to implement operations corresponding to invocations of operating system interfaces by a program, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for operating system interface implementation using network-accessible services supported by provider networks are described. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. The term "multi-tenant" may be used herein to refer to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. A provider network may support single-tenant services (such as for private cloud implementations) in some embodiments, either in addition to, or instead of, multi-tenant services. A given provider network may typically include several large data centers hosting various resource pools, such as collections of physical and/or virtualized computer servers, storage devices, networking equipment and the like, needed to implement, configure and distribute the infrastructure and services offered by the provider.

According to some embodiments, at least a subset of the resources and services of a provider network may be configured as a distributed computing platform (DCP) specifically targeted for executing programs that include invocations of various operating system interfaces in a transparent manner, so that the programs themselves do not have to be re-written to take advantage of the various services of the provider network. An analogy to the way programs are conventionally compiled and executed may help to explain the manner in which the DCP may be used in such embodiments. A given program P1, may, for example, be written to conform to a portable operating system interface standard such as a particular version of POSIX. Thus, P1 may include invocations of various OS APIs (operating system application programming interfaces) or system calls, such as memory management system calls, storage input/output system calls, process management or thread management system calls, signaling system calls, networking system calls, and the like, defined in the standard. In addition to the operating system calls, of course, P1 may include various computations, calls to other libraries and applications, and so on. The program may have originally been written in accordance with the standard so that it can be compiled for, and run at, various different processing platforms without requiring changes to the program's source code. Just as respective executable versions of P1 may be compiled for various traditional uniprocessor and multi-processor architectures, one or more executable versions of P1 may be generated for execution using resources of the DCP in some embodiments. When a particular thread of P1 is to be scheduled for execution at a traditional platform, e.g., at program startup or as a result of a fork( ), one or more hardware cores or processors of the traditional platform may be identified for the thread. When a particular thread of P1 is to be scheduled at the DCP, one or more compute instances (e.g., virtual machines) of a computing service implemented at the DCP may be configured for use by the thread (e.g., either by selecting from a pool of pre-configured instances or by launching new instance(s)), and then the operations of the thread may be performed using the CPUs or cores allocated to the compute instance or instances. In some cases, operations of a single thread of the program may be distributed among several different compute instances, e.g., in order to achieve higher scalability than would have been possible if only a single instance were used. The selection of the compute instance or instances may be orchestrated or controlled by an operating system service (OSS) implemented for the DCP at the provider network in at least some embodiments. In at least one embodiment, a client on whose behalf a particular program is to be executed at the DCP may provide an indication of a resource selection policy to the OSS, which may be used by the OSS to select specific resources from among the wide variety of resources available for the program. For example, a resource selection policy may indicate that the client would prefer to utilize, to the extent possible, compute instances of a certain performance capability or price range for the program, or that the client would prefer to utilize one particular storage service rather than another for storage-related operations of the particular program. Clients may not be required to indicate such policies in some embodiments, and the OSS may instead utilize various heuristics (e.g., a heuristic according to which resources available nearby a compute instance at which a thread of the program is run are generally to be used in preference to remote resources) to select specific resources if no client-provided policy is available. In some embodiments in which a computing service is implemented at the provider network, the OSS may comprise a portion of the back-end administrative infrastructure of the computing service, which may also be referred to as the control plane of the computing service.

An OSS may be configured to dynamically modify the set of resources (such as the number of compute instances, or the type of compute instances) deployed for a given program in at least some embodiments to implement an automated scaling policy associated with the program. From the perspective of the client on whose behalf the program P1 is run at the DCP, the OSS (and/or the other services of the provider network) may be largely or fully transparent—e.g., apart from requesting the compilation and/or execution of the program at the DCP, and in some cases optionally indicating resource selection policies or limits on resources or budgets as described below, the client may not need to interact very much with the OSS or other services. In general, the OSS may be considered responsible for translating at least some of the various operating system interfaces invoked by P1 into corresponding invocations of service programmatic interfaces of the provider network. The relationship between the operating system interfaces and the provider network service interfaces may, at least in some cases, be more complex than a simple 1:1 mapping—for example, to implement operations corresponding to a given storage read or write operation of P1, more than one service API call to one or more storage-related services may be required. In addition, in at least some embodiments, the mappings between the operating system calls and the service API calls may be dynamic rather than static—e.g., depending on the state of P1 or on the workload levels at various resources of the provider network, a different set of service interfaces may be used at time T1 for a given operating system call invocation than is used for the same operating system call invocation at time T2.

When a storage-related system call is invoked in the program P1 as it executes at a particular compute instance, at least in some embodiments the OSS may have to determine which storage resources of the provider network are to be used for the corresponding operation or operations. At a conventional computing platform, several levels of a storage hierarchy may be available to implement a storage operation corresponding to a system call invocation, such as various processor caches, a volatile main memory, storage device caches, non-volatile storage devices, and so on. At the DCP, at least in some embodiments, a much richer set of choices may be available for storage operations. For example, in addition to the hierarchy levels available on a given compute instance, which may correspond to those listed above for a conventional platform, storage devices of various types of storage services and/or database services may be available. In one embodiment, for example, a block storage service of the provider network may enable access to block storage devices from compute instances, such as mountable block-level volumes that implement block device programmatic interfaces for I/O. Another storage service may support access to unstructured storage objects accessible via web services interfaces rather than block device interfaces. One or more relational or non-relational database services, and/or distributed caching services, may also be available for storage-related operations in the provider network in at least some embodiments. Any of the various elements of the local storage hierarchy at the compute instances, the storage services, database services, caching services and the like may be used for read and/or write operations corresponding to storage-related system calls in the program P1.

Operations corresponding to networking-related system calls invoked by program P1 may be performed using any of a variety of networking resources of the provider network in various embodiments. For example, in one embodiment, a particular network address (such as an Internet Protocol (IP) address) may be assigned for P1 by the OSS. As noted above, in at least some cases more than one compute instance may be used to perform P1's operations. The OSS may initiate or perform the necessary networking configuration to ensure that for any networking transfers directed to P1 or originating from P1, the assigned network address is used as the source or destination. The configuration operations may involve, for example, assigning the network address to one or more virtual or physical network interfaces attached to one or more compute instances used for P1, making routing changes, or activating a redirection mechanism at one or more networking components of the provider network.

In various embodiments, synchronization or locking mechanisms may be required to implement some types of program operations as implemented in the DCP. For example, a single memory allocation operation invoked from the program running on several different compute instances of the DCP may in some cases result in the allocation of respective portions or blocks of virtual memory at a plurality of compute instances by a distributed memory management component of the OSS. In such a scenario, a concurrency control mechanism may be required, e.g., to prevent inadvertent overwriting of the allocated memory object from multiple compute instances, or to ensure that any one compute instance does not read a partially-written value generated by another instance. In some embodiments, one or more locking services implemented within the provider network may be used for concurrency control or thread synchronization.

In at least some embodiments, not all the operating system interfaces supported at a traditional operating system or defined in a standard may necessarily be implemented using provider network resources. In one such embodiment, for example, a subset C1 of operating system calls defined in the standard may be translated or mapped to service API invocations, while another subset C2 of the standard's system calls may be implemented using conventionally acquired local resources (e.g., local CPUs or cores, local file systems etc. at one or more compute instances). In at least some embodiments, while several of the network-accessible services used to execute programs at the DCP may be accessible directly by clients for other purposes, at least some provider network services may be restricted to internal use only. For example, a computing service or a storage service used to schedule threads of a program P1 or perform I/O operations on behalf of P1 may also be used by clients of the provider network to acquire compute instances and/or storage devices for applications unrelated to the use of the DCP. However, a locking service used for concurrency control purposes among various compute instances being deployed to execute threads of a program P1 may not be accessible directly to clients.

In addition to core computing, storage and networking services, other services of the provider network may also be used to help support operating system interface calls in some embodiments. For example, in one embodiment, a workflow service may be implemented at the provider network, and such a workflow service may be used to schedule pre-configuration of compute instances for use by the OSS. A pool of compute instances to be deployed dynamically on an as-needed basis to execute programs targeted for the DCP may be established, and additional instances may be added to the pool based on workflows implemented using the workflow service. Other examples of services that may be employed for program execution at the DCP may include load balancing services (which may be used to ensure that the workload of a program is distributed appropriately among a plurality of compute instances assigned to the program), and distributed logging services (which may be used to manage log messages generated during execution of a program at several different resources of the provider network).

In at least some embodiments, DCP versions of command-line and/or scripting interfaces typically available at a conventional operating system may be provided, in addition to the translations of system calls into service APIs. In one such embodiment, for example, respective DCP versions of Bash (the Bourne Again Shell) or ksh (the Korn shell) and the like may be supported. In one embodiment, DCP versions of scripting languages such as Perl, AWK, or Python may also be supported. In some such embodiments, the resources of the provider network may be utilized for various pre-existing scripts written using the command-line interfaces and/or languages, without requiring any modifications, in addition to being utilized for programs such as P1 that are specifically compiled for the DCP environment. Thus, the scalability theoretically made possible by the provider network's vast resources may become a practical reality achievable by a substantial number of pre-existing (as well as new) scripts and programs, without extensive re-programming or programmer re-training.

Distributed Computing Platform for Implementing Operating System Calls

FIG. 1 illustrates the use of resources of a distributed computing platform to implement operations corresponding to invocations of operating system interfaces by a program, according to at least some embodiments. As shown, a program P1 may comprise a plurality of operating system calls 105 such as 105A and 105B. The operating system calls 105 may be interspersed among other operations 102 of the program (e.g., 102A, 102B or 102C), which may include computation operations, calls to non-operating-system applications or libraries, and so on. In at least some embodiments, the source code of P1 may have been developed in compliance with one or more operating system interface standards, such as a POSIX standard developed to enhance the portability of programs across different computing platforms. A programmer may typically expect that if a program is written in accordance with such a standard, source code changes may not be required in order to execute the program in different execution environments that claim compatibility with the standard (although the source code may need to be recompiled for the different platforms). A number of different types of operating system calls 105 may be used in P1, including, for example, calls related to memory management (e.g., to allocate, free or share memory objects), thread/process scheduling, inter-process communication, file system or file I/O, block device I/O, networking (e.g., using sockets), timers, random number generation, and so on. In some embodiments, a subset or all of the operating system calls used by program (or wrapper functions for the system calls) may be packaged as a "standard library" (e.g., the C standard library) usable for programs written in a particular language or set of languages, with the appropriate version of the standard library being installed at the platforms where the program is expected to be run. For embodiments in which wrapper functions for operating system calls are provided via standard libraries, such that the invocation of a given wrapper function from a program results in a corresponding invocation of a system call, the terms "system call" or "operating system call" may be used as synonyms herein for the corresponding wrapper functions.

In the depicted embodiment, the program P1 may be targeted for execution at a distributed computing platform (DCP) 110. The distributed computing platform 110 may implement at least some of the operating system interfaces invoked in P1 using resources of a plurality of network-accessible services of a provider network. The provider network may, for example, include a variety of computing resources 120, storage resources 122, networking resources 124, as well as various aggregating or configuration services 126 that may select and configure the specific computing, storage and/or networking services to be used on behalf of various programs similar to P1. In particular, in some embodiments, an operating system service may be implemented to manage resource management for programs such as P1 targeted for execution at the DCP 110. The DCP may expose various programmatic interfaces or APIs to the services (including the operating system service) that manage the computing, storage and networking resources; such APIs may be referred to herein as DCP APIs 150. At least a subset of the operating system calls invoked within P1 (such as 105A and 105B) may, in effect, be translated into corresponding sets of one or more DCP API calls 150, such as 150A and 150B. A given set of DCP API calls 150 in turn may result in the assignment and use of various resources accessible at the DCP to obtain results of the operating system call invocations, including selected computing resources, storage resources, networking resources, and so on. The term "DCP-targeted program" may be used herein to refer generally to programs such as P1 that are to be run in the manner described above, i.e., using resources of the provider network to implement operating system primitives invoked within the program. Different sets of resources and/or DCP services may be used to perform operations corresponding to respective operating system calls invoked in P1—e.g., calls 150A may use computing resources, networking resources and aggregating services, while calls 150B may use computing resources, storage resources, networking resources and aggregating services.

An executable version of program P1 suitable for the computing resources of the DCP environment may be generated using any of several techniques in different embodiments. In one embodiment, a special compiler (or a set of compiler flags specific to the DCP) may be provided for use by a client or by the programmer responsible for writing the source code for P1, and the execution of P1 using the DCP may be initiated at one of the computing resources 120 of the DCP. Compared to the types of compile-time optimization opportunities that are typically available for conventional execution platforms, a wider variety of compile-time (or pre-compilation) optimization opportunities may be available in the DCP context, given the vastly larger set of resources and service capabilities that can be used for a given program in such embodiments. In at least one embodiment, a client (or an administrator of the provider network) may specify one or more compiler flags to take advantage of specific features of the DCP for a given program's execution (such as extremely high levels of availability, or resiliency to infrastructure failures, that can be achieved by using resources spread among several different geographically-dispersed data centers). In another embodiment, a client that wishes to use the DCP for executing a program may simply provide the source code programmatically to the DCP, and the DCP may generate the needed executable version. In some embodiments, a client may initiate execution of P1 at a computing platform outside the provider network (e.g., within a client-owned data center or a client's office premises), and a library or execution wrapper program at that platform may interact with various services of the DCP to execute P1 using provider network resources.

Computing, storage, networking and other resources of the DCP may be dynamically selected and assigned to perform various subsets or all of the operations of P1 in various embodiments. For example, in one embodiment, each thread of execution of P1 may be mapped to a corresponding computing resource 120. When P1's initial thread is started, or when a new thread is created as a result of a fork( ) or similar call, the DCP (e.g., via an administrative component of its operating system service) may identify the specific computing resource to be used, and perform the required configuration at the selected computing resource. An executable version of P1 may, for example, be loaded from one or more storage resources 122 into one or more memories accessible from the selected computing resources 120. A file created, written and/or read by one or more threads of P1 may be implemented or emulated using storage resources 122 that are accessible over a network from the computing resources and assigned for P1's use. Various networking resources 124 of the DCP (such as virtual or physical networking interfaces, virtual network addresses, switches, routers, gateways, and the like) may be assigned for use during P1's execution. The networking resources may be used for data transfers to/from P1 corresponding to networking calls included in P1, and for coordination of the various other resources being used for P1. In at least some embodiments, additional resources may be assigned to P1 dynamically (or resources already in use for P1 may be freed) based on applicable scalability policies and on an analysis of metrics collected. A result of P1 as a whole, which may be based at least in part on the results obtained at the various DCP resources used for the different operating system call invocations, may be generated and provided to the client on whose behalf P1 is executed.

Figure 2:
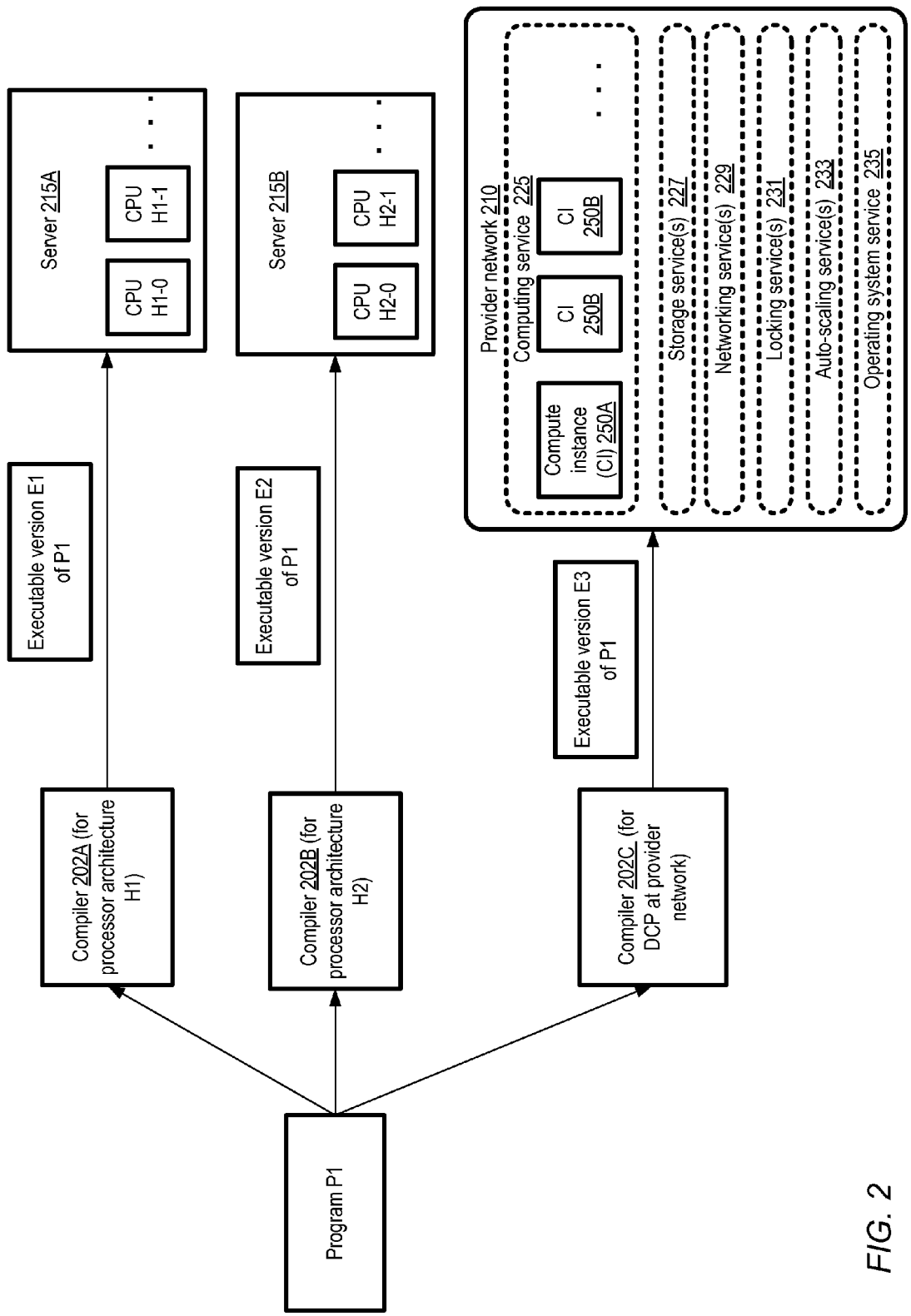
FIG. 2 illustrates the generation of several different executable versions of a given program, including a particular executable version for which resource allocation is managed by an operating system service implemented at a distributed computing platform, according to at least some embodiments.

As mentioned above, a program P1 that is compatible with an operating system standard such as POSIX may be run at any of several different execution platforms. FIG. 2 illustrates the generation of several different executable versions of a given program, including a particular executable version for which resource allocation is managed by an operating system service implemented at a distributed computing platform, according to at least some embodiments. As shown, compilers 202A, 202B and 202C may generate respective executable versions E1, E2 and E3 of the same program P1. E1 may be run at server 215A that includes one or more processors implementing processor architecture H1, such as CPUs H1-0, H1-1, and so on. E2 may be run at server 215B that includes one or more processors implementing a different processor architecture H2, such as CPUs H2-0, H2-1, etc. E3 may be run using resources of various services implemented at provider network 210, which together may constitute a distributed computing platform that is compatible with the operating system standard.

The source code of P1 may be written at a level of abstraction that does not require knowledge of the low-level differences in processor or memory implementations between H1 and H2. Similarly, the programmer responsible for P1 need not be aware of the details of various services and resources of the provider network in the depicted embodiment. Just as CPUs or cores may be selected transparently (with respect to the programmer) to execute various operations of P1, compute instances 250 (such as 250A, 250B or 250C) of a computing service 225 of the provider network 210 may be selected for E3. The compute instances 250 may each comprise virtual machines in some implementations, one or more of which may be instantiated at a given hardware server of the computing service 225 called an instance host. A given instance host may implement compute instances 250 for several different clients in some embodiments. In the depicted embodiment, operating system service (OSS) 235 may be implemented at the provider network 210 to orchestrate resource management for E3. The OSS 235 may, for example, comprise its own set of computing devices that are responsible for selecting and configuring compute instances for programs such as P1, acquiring storage space for P1 from one or more storage services 227, and so on.

In at least some embodiments, networking devices (e.g., routers, switches, gateways) or other resources of one or more networking services 229 (such as a virtual isolated network service) of the provider network may be used for network transfers performed on behalf of P1's execution. One or more locking services 231 may be employed for concurrency control operations required during P1's execution at the DCP, e.g., to coordinate access to shared data from multiple compute instances running respective threads of P1. In at least some embodiments, the provider network 210 may implement an auto-scaling service 233 that may be utilized by the OSS 235 to deploy (or decommission) resources for P1's execution in accordance with a scaling policy. Some or all of the services illustrated in FIG. 2 may expose web-services APIs to their external (i.e., outside the provider network) clients and/or their internal (i.e. within the provider network) clients.

As noted above, in at least some computing environments, shared libraries implementing (or acting as wrappers for) a variety of commonly-used operating system calls may be included as part of a typical operating system installation. For example, in some variants of the Unix™ or Linux operating systems, a file called "libc.so" (or "lib.so.N" where N indicates a version number) comprising an implementation of the "C standard library" or "libc" may be installed in a well-known directory (e.g., /usr/lib) of the operating system installation. When a given program is loaded for execution, the C standard library may be linked to it, and invocations of at least some of the operating system calls within the program may result in the execution of code from the library. In at least some embodiments, customized versions of one or more operating system libraries such as libc may be developed and installed to enable the use of the distributed computing platform's services.

Figure 3:
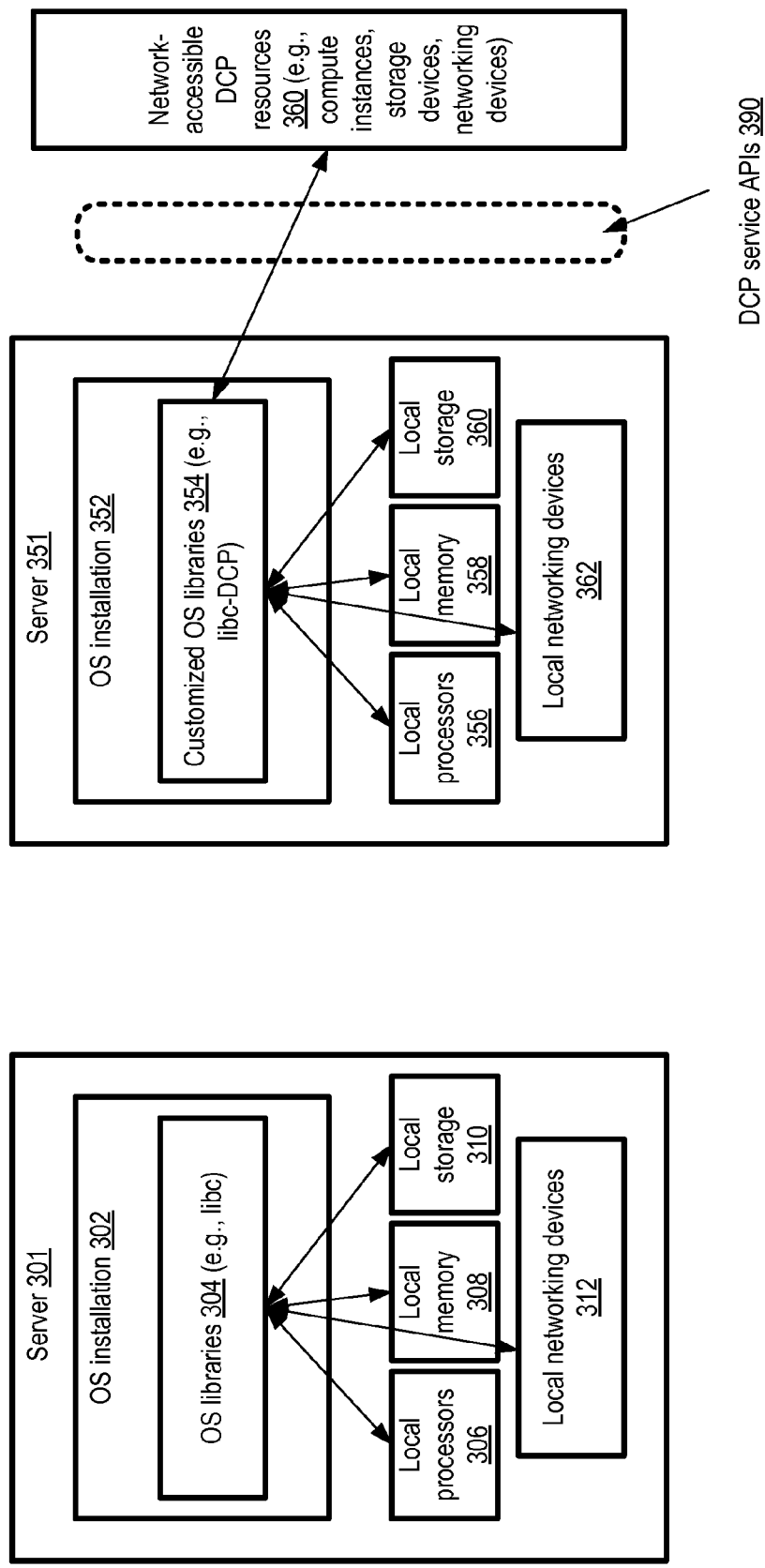
FIG. 3 illustrates a use of customized operating system libraries to invoke application programming interfaces of one or more network-accessible services of a distributed computing platform, according to at least some embodiments.

FIG. 3 illustrates a use of customized operating system libraries to invoke application programming interfaces of one or more network-accessible services of a distributed computing platform, according to at least some embodiments. Two computer servers 301 and 351 are shown, with respective operating system installations 302 and 352. At server 301, a conventional set of operating system libraries 304, including libc, is installed. As a result, programs executed at server 301 and linked to the conventional libraries may typically utilize local resources at the server, such as local processors 306, local memory 308, local storage devices 310, and local networking devices 312, for most or all operating system call invocations. In contrast, at server 351, a version of at least some operating system libraries that is customized for the DCP may be installed. For example, the operating system libraries 354 may include a custom version of libc, which is referred to in FIG. 3 as "libc-DCP". When a program is linked to the customized operating system libraries 354, invocations of at least some operating system calls during the execution of the program may result in invocations of one or more DCP service API calls 390. As a result, one or more network-accessible resources 360 (such as computing, networking or storage resources) of the DCP may be deployed to obtain results of the invocations of the operating system calls. It is noted that not all the system calls within a given program may necessarily be translated to DCP service API calls 390—e.g., a subset may still be implemented fully using local operations at processors 356, memory 358, storage 360 and/or networking devices 362. In some embodiments, different versions of the operating system service and the DCP execution environment may be released over time, and the fraction of the operating system calls that are implemented using the DCP service APIs 390 may change in different releases.

Operating System Service Components

Figure 4:
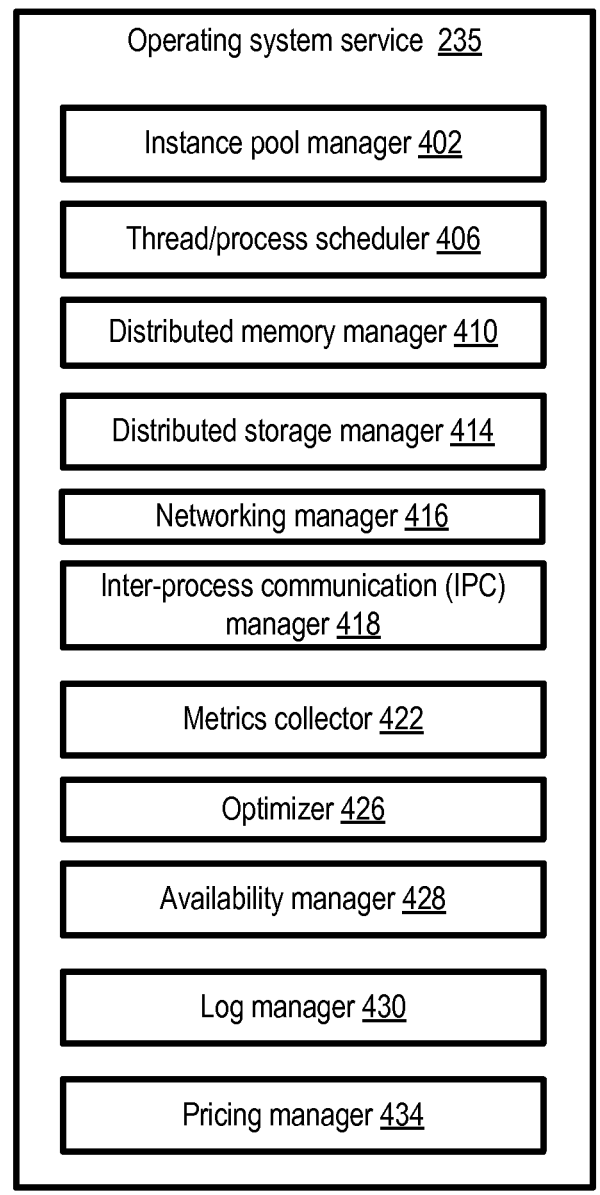
FIG. 4 illustrates example components of an operating system service, according to at least some embodiments.

As mentioned earlier, in at least some embodiments an operating system service (OSS) may be implemented at a provider network to coordinate resource management at run time on behalf of programs executing at the distributed computing platform. Such an OSS may be implemented using a set of dedicated administrative or control-plane resources of the provider network such as computer servers, storage devices, and the like that may typically not be directly accessible by clients. FIG. 4 illustrates example components of an operating system service, according to at least some embodiments. Some or all of the OSS components may themselves be implemented in a distributed fashion, e.g., using a plurality of software and/or hardware components located at one or more data centers of the provider network in at least some embodiments.

As shown, the OSS 235 may include an instance pool manager 402 responsible for pre-configuring one or more pools of compute instances that can be used for executing programs targeted for the DCP. In some embodiments, the instance pool manager 402 may utilize other provider network services, such as a workflow service or a job scheduling service, to acquire compute instances for the pool or pools, and/or to release instances from the pool(s) in response to changing demands for program execution.

In at least some embodiments, thread/process scheduler 406 may be responsible for determining run-time mappings between the program and compute instances: e.g., at which specific compute instances various threads of execution of the program are to run, and in some cases for determining the number of threads of execution of the program. Depending on the nature of the program and on the performance capabilities of the compute instances available (e.g., in the pools populated by the instance pool manager 402), multiple threads may be scheduled for execution at a single compute instance in some embodiments. In some embodiments, a given compute instance may be used for threads of more than one program concurrently (e.g., compute instances may be used in a multi-tenant mode for executing the programs targeted to the DCP), while in other embodiments a given compute instance may be restricted to one program at a time.

Distributed memory manager 410 may be configured to determine how memory objects allocated by the program are to be mapped to the respective memories of the one or more compute instances being used for the program execution. For example, if a particular data structure DS1 is to be accessed by two threads T1 and T2 of the program (with read and/or write permissions granted to both threads), and the two threads are being run at different compute instances CI1 and CI2, the distributed memory manager 410 may have to decide whether DS1 should be allocated using CI1's memory alone, CI2's memory alone, or a combination of CI1's and CI2's memory. The distributed memory manager 410 may also be responsible for managing concurrency control with respect to the shared data in some embodiments, e.g., using a locking service 231 implemented at the provider network or using some other synchronization mechanism. In at least some embodiments, non-locking concurrency control techniques may be used to coordinate access to memory objects and/or storage objects. For example, an interleaving technique for update windows may be implemented in one embodiment, in which distinct time windows are provided for updates to a memory object from different threads of a program executing at different instances, so that no more than one thread is able to modify the memory object at a time. In such a technique, a first thread T1 running at instance I1 may be allowed to update/modify a data structure during a time window W1 (of, say, a few microseconds or milliseconds), a second thread T2 running at instance I2 may be allowed to update/modify the data structure during the next time window W2, and so on, without necessarily employing any locking Such an interleaving technique may be considered analogous to a token-passing mechanism in which an update-permission token is passed from one thread of the program to another in some selected order, and each thread is given the opportunity to update the corresponding object for a short period while the thread has the token. Other non-locking concurrency control mechanisms that do not rely on time windows may be employed for coordination of accesses by multiple threads to various memory or storage objects in different embodiments. In at least some embodiments, the distributed memory manager 410 may select any of a set of alternative techniques, e.g., based on the performance levels achievable by the different techniques and based on the performance requirements of the DCP-targeted program, to implement memory mapping system calls and shared-memory related calls, such as calls to "mmap", "shmat" and the like in Unix™-based operating systems.

Distributed storage manager 414 may be responsible for performing read and write I/Os on behalf of the program being executed at the DCP in the depicted embodiment. As mentioned above, a complex storage hierarchy that includes numerous levels including processor caches of the instance hosts at which the compute instances used for the program are run, volatile memory at the instance hosts, local non-volatile storage devices such as various types of disks, network-accessible storage devices of various services such as block storage services or unstructured storage services, database services, archival storage services, and the like may be available for storage operations. The distributed storage manager 414 may map various storage objects (such as files or volumes) accessed by the program to selected levels of the hierarchy, select the particular storage devices at which the storage objects are to be stored, move the objects between different levels of the hierarchy as needed, manage caching of the objects at various levels of the hierarchy, and so on.

A networking manager 416 may be configured to perform the networking configuration operations necessary to execute the DCP-targeted programs in some embodiments. Such a networking manager may, for example, obtain one or more IP addresses for a given program, configure the necessary virtual and/or physical network interfaces at the instances used for the program so that all the instances can receive and transmit traffic with using the IP address(es) assigned to the program, request routing changes, configure packet redirector modules, and so on. In one embodiment, the computing service may assign different IP addresses to each instance host (and compute instance) by default, and redirector modules may be configured within the virtualization management software at various instance hosts and/or at network devices to redirect traffic targeted for P1 to the appropriate set of instances. Inter-process communication (IPC) manager 418 may be responsible for responding to invocations of operating system calls that involve signals, semaphores, or other IPC primitives by DCP-targeted programs in the depicted embodiment. Various IPC operations that may have been implemented entirely within a single system on a conventional platform may require network transfers in the DCP environment, and the IPC manager 418 may set up, manage the shared use of, and dismantle network connections as needed. In some embodiments, long-term connections may be established between a pair of compute instances being used for DCP-targeted programs, and the data of several different IPC messages may be transmitted over the same connection.

In at least some embodiments, a metrics collector 422 may be used to gather resource utilization, throughput, response time and other data pertaining to various DCP service API calls employed on behalf of the DCP-targeted programs. In many cases, more than one implementation approach may be available at the DCP for a given operating system primitive, and the metrics collected may be used, for example by an optimizer component 426 of the OSS, to select the most appropriate implementation. The optimizer 426 may also take into account pricing differences between the different implementations, e.g., in view of budget constraints of various clients on whose behalf the DCP-targeted programs are run, or in view of the service level agreements reached with the clients. In at least some embodiments, the optimizer 426 may collect profiling information from a running program (e.g., information detailing how much time is spent, and which set of resources are used, for various sub-units of the program), and may make placement decisions for the program based on the profiling information. For example, one or more of the program's threads may be migrated to a different compute instance with a faster set of processors, or a decision to use a different type of storage device for objects read/written by the program may be made based on the profiling results.

An availability manager component 428 may be configured to monitor the health of the various resources used for a particular program execution, and to replace or restart resources that have failed or are no longer responsive in the depicted embodiment. For example, if N compute instances are configured to execute respective threads of the program, the availability manager 428 may use a heartbeat mechanism to monitor the status of the N instances. If one or more of the instances becomes unresponsive or unreachable, replacement instances may be configured. In some implementations, the compute instances may periodically save their state at a persistent storage device (e.g., at a storage service of the provider network) to enable quick recovery or replacement after a failure. In some embodiments, the OSS may also comprise a log manager 430 that collects various log messages from different resources (e.g., compute instances, storage service nodes, networking nodes and the like) that are involved in executing the DCP-targeted programs. A consolidated view of log messages collected from various resources may be provided in some embodiments, which may be helpful in debugging or for performance analysis.

In at least some embodiments, different pricing policies may be applied to DCP-targeted programs than to other programs executed using the provider network's resources—e.g., a premium may be charged for the automated scaling being performed when the DCP is used. In other embodiments, no premiums may be charged—e.g., when determining the billing amounts associated with the execution of a program on the DCP, the sum of the charges that would be incurred as a result of using the various resources individually may be computed. A pricing manager 434 may be responsible for determining the billing amounts to be charged to clients on whose behalf the DCP-targeted programs are run. As described below with reference to FIG. 6, in at least some embodiments, clients may indicate budget limits for the execution of their DCP-targeted programs, and the pricing manager may be configured to enforce such limits in collaboration with the other components of the OSS. It is noted that in different embodiments, not all the components shown in FIG. 4 may be included within an OSS, and that in at least some embodiments other components not shown in FIG. 4 may be incorporated within an OSS.

Figure 5:
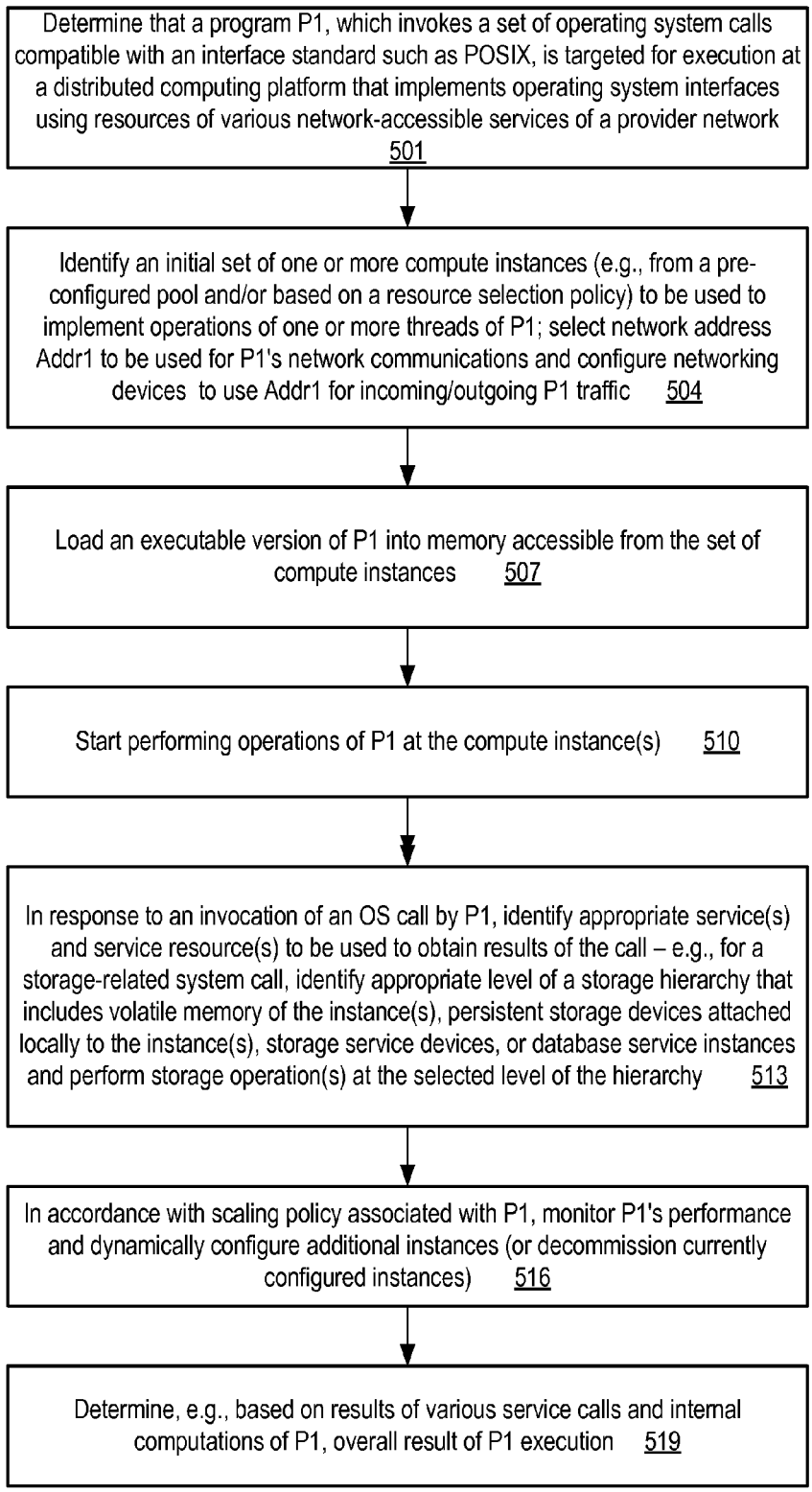
FIG. 5 is a flow diagram illustrating aspects of operations that may be performed to utilize network-accessible services of a distributed computing platform to obtain results of invocations of operating system interfaces by a program, according to at least some embodiments.

Methods Utilizing Network-Accessible Services for Implementing Operating System Calls FIG. 5 is a flow diagram illustrating aspects of operations that may be performed to utilize network-accessible services of a DCP to obtain results of invocations of operating system interfaces by a program, according to at least some embodiments. As shown in element 501, a determination may be made that a particular program P1, which includes invocations of various operating system calls (including, for example storage-related and networking-related system calls), is to be executed at a distributed computing platform that implements a set of operating system interfaces using resources of a plurality of network-accessible services of a provider network. The determination may be made, in some embodiments, by a component of an OSS implemented within the provider network. In one embodiment, a request to compile and/or run the program at the DCP may be received from a client. In some cases a client may transmit the program (either in source form or in executable form) to the OSS in an execution request, and the OSS may perform some set of checks to verify that the program is suitable for the DCP. In at least one implementation, a compiler may be provided that analyzes the source code of the program and, if the program is found acceptable (e.g., if it is compatible with a standard such as POSIX), generates an executable version of the program for the DCP. Tools other than compilers may be implemented in some embodiments, e.g., to perform a preliminary analysis on a program to verify that it meets a set of requirements for execution at the DCP, or to determine the probability that a given program would be able to improve its performance as a result of execution at the DCP. In some embodiments, the executable version of the program may be stored at a storage service of the provider network, from which it can be retrieved and loaded into the appropriate memory for execution. In one embodiment, if a DCP-compatible version of a command shell (such as bash or ksh) or a DCP-compatible version of a scripting language (e.g., Perl) is used to request an execution of the program, the program may automatically be assumed to be targeted for execution at the DCP.

An initial set of one or more compute instances (e.g., from a pre-configured pool) to be used to implement operations of one or more threads of P1 may be identified (element 504) in response to an explicit or implicit request to execute P1. In some embodiments, a resource selection policy indicating preferences or requirements of a client on whose behalf P1 is to be executed may be used to select the types of compute instances (as well as other resources) to be used for P1. The mapping between P1 and the instances may be determined, for example, by a thread/process scheduler component 406 of the OSS. In one simple implementation, each of P1's threads or processes may be run at a respective compute instance, for example. In some implementations, multiple threads may be run at a single compute instance, or more than one compute instance may be used for a single thread. A pool of pre-configured instances may be created in some embodiments, from which instances can be selected on demand for P1's execution, so that the overhead of starting up new compute instances can be avoided. In some embodiments, a network address Addr1 to be used for P1's network communications may be selected, and the appropriate networking devices (e.g., the virtual and/or physical network interfaces, routers, switches, etc. that are used by or for the selected instances) may be configured to use Addr1 for traffic directed to or from P1. In one implementation, if two compute instances are used to implement respective threads of the P1, the first instance may be configured to receive network traffic directed to Addr1, and also to indicate Addr1 as a source address for outbound network traffic generated by operations of P1 that are executed at the first instance. Similarly, the second instance may also be configured to receive network traffic directed to Addr1, and to indicate Addr1 as a source address for outbound network traffic generated by operations of P1 that are executed at the second instance.

An executable version of P1 may be loaded into the memory of (or into memory accessible from) the selected compute instance or instances (element 507). In some cases, the compiled version of the program may be stored at a storage service as described above, and may be retrieved from the storage service into the compute instance memory or memories. The operations of P1 may then be initiated at the one or more compute instances (element 510).

In response to an invocation of an operating system call by P1, the appropriate service(s) and service resource(s) to be used to obtain results of the call may be identified (element 513). For example, for a storage-related system call such as a read or a write to a file, the appropriate level of a storage hierarchy that includes volatile memory accessible from the instance(s), persistent storage devices attached locally to the instance(s), storage service devices, or database service instances may be identified. Operations corresponding to the operating system call may then be performed at a storage location at the selected level of the hierarchy. Similarly, for other types of operations requested in the operating system call, other provider network resources may be deployed. For a network transfer using a socket API in P1, for example, the appropriate network devices of the provider network (such as physical or virtual network interfaces accessible from the compute instances) may be used to transmit one or more packets. As indicated above, in some embodiments, a client-supplied resource selection policy may help guide the selection of specific provider network resources and/or services to be used for various operating system calls of P1.

In at least some embodiments, an automated scaling policy may be associated with programs such as P1. For example, in accordance with one such policy, the OSS may be configured to complete the operations of P1 as quickly as possible, using as many compute instances (up to some limit) as necessary. In accordance with another policy, the latency of completion of some set of P1's operations may be identified as the metric of greatest interest, and efforts to reduce average latency by deploying the fastest-available resources may be performed by the OSS. In accordance with the scaling policy associated with P1, P1's performance may be monitored in at least some embodiments (element 516). Additional instances or other resources may be dynamically configured, and/or currently configured instances or resources may be released or decommissioned as needed on the basis of the metrics and the scaling policy. The overall result of P1's execution, which may be based at least in part on the results of the various DCP service calls and P1's internal computations, may eventually be obtained and provided to the client on whose behalf P1 was executed (element 519).

Figure 6:
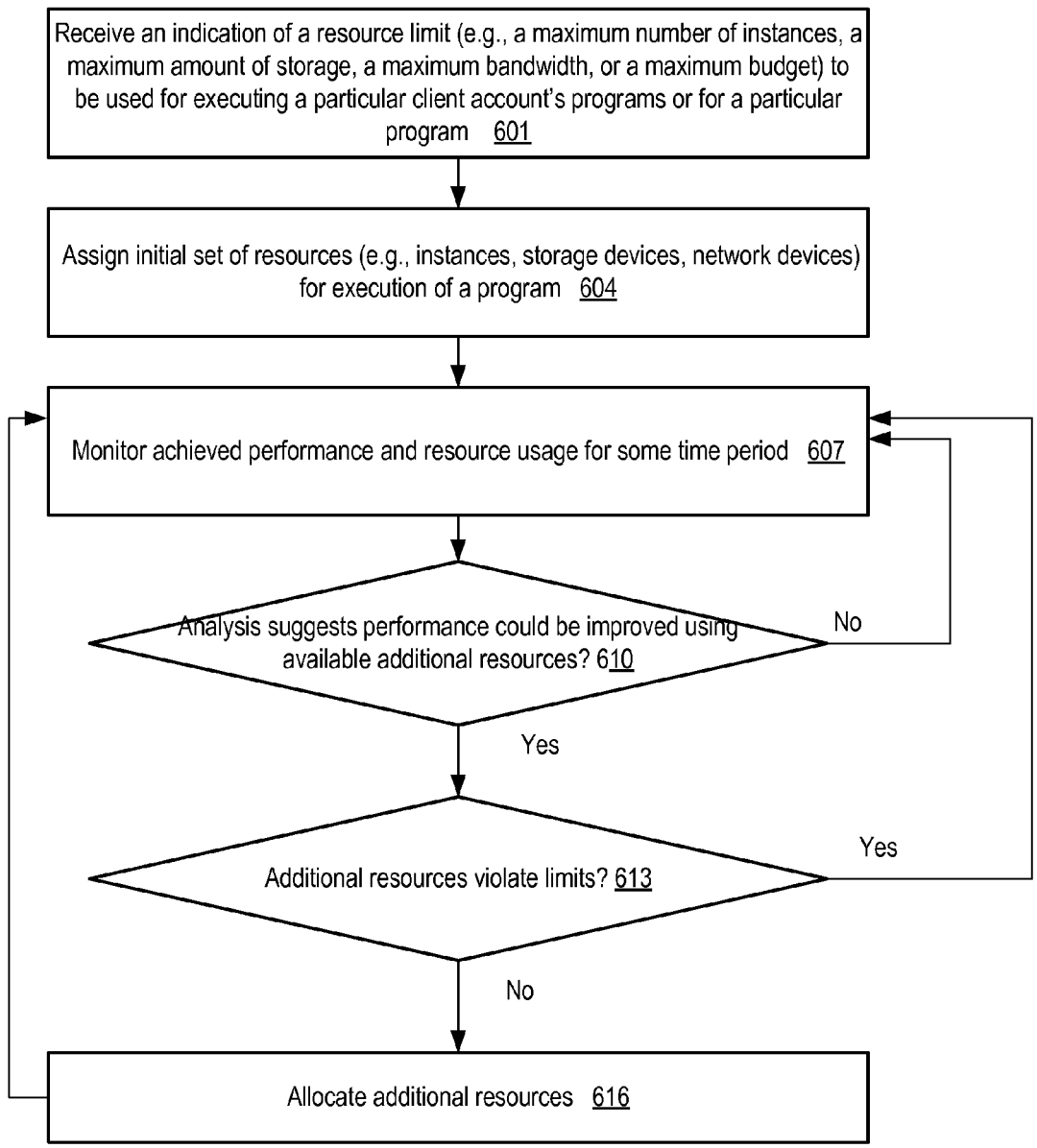
FIG. 6 is a flow diagram illustrating aspects of operations that may be performed by an operating system service implemented at a distributed computing platform in response to resource limit requests received from clients, according to at least some embodiments.

As mentioned above, in some embodiments, the OSS may be allowed to dynamically deploy additional resources in accordance with scaling policies or goals associated with DCP-targeted programs. In some cases, a client may wish to impose limits on the resources deployed, e.g., to limit the corresponding billing amounts that the client may be required to pay. FIG. 6 is a flow diagram illustrating aspects of operations that may be performed by an operating system service implemented at a distributed computing platform in response to resource limit requests received from clients, according to at least some embodiments. As shown in element 601, an indication of a resource limit (e.g., a maximum number of instances, a maximum amount of storage, a maximum amount of network bandwidth, or a maximum budget) to be used for executing a particular program may be received by the OSS, e.g., via one or more programmatic interfaces implemented by the OSS. In some cases, the resource or budget limits may be applied collectively to all DCP-targeted programs associated with a given client account of the provider network. For example, a corporation may set up a client account Corp1 with the provider network, and several different user accounts user 1, user2, . . . , may be set up under the client account. Each user account may be allowed to request execution of DCP-targeted programs. In such a scenario, a resource limit may be requested at various levels: for the client account Corp1 as a whole, for individual user accounts, or for a specific program whose execution is requested by a given user.

An initial set of resources (e.g., compute instances, storage devices, network devices and the like) may be assigned for the execution of a particular program (element 604). The performance of the program and the utilization of resources for the program may be monitored for some time period (element 607). If an analysis (implemented for example by an optimizer component 426 of the OSS) suggests that performance could be improved by dynamically deploying additional resources (as detected in element 610), and the deployment of additional resources does not violate the requested limit or limits (as detected in element 613), the additional resources may be allocated to the program (element 616). If the analysis does not suggest that performance would be improved, or if the resource or budget limit would be violated if additional resources were deployed, the program may continue execution using its currently allocated set of resources. Whether additional resources were deployed or not, the monitoring and analysis steps (corresponding to elements 607 onwards) may continue until the program eventually terminates.

It is noted that in various embodiments, operations other than those illustrated in the flow diagrams of FIGS. 5 and 6 may be implemented to support the various techniques described for implementation of operating system interfaces using provider network-accessible service resources, and that some of the operations shown may not be implemented, or may be implemented in a different order or in parallel rather than sequentially.

Use Cases

The techniques described above, of deploying resources of a provider network to implement operating system primitives, may be useful in a variety of scenarios. Although provider networks with vary large resource capabilities have been available for a few years, a substantial number of programmers are not yet trained to fully exploit the rich feature sets of the services implemented at the provider networks. Furthermore, the feature sets of the provider network services keep changing relatively rapidly, and new services are brought online every few months. As a result, a substantial number of programs may not be able to achieve the kinds of scalability, availability and other service characteristics that are theoretically possible at the provider networks. If the equivalent of an operating system standard, such as POSIX, is implemented as a network-accessible service, it may become possible to utilize the large resource sets and rich feature sets of provider network services for a far wider range of programs.

Illustrative Computer System

Figure 7:
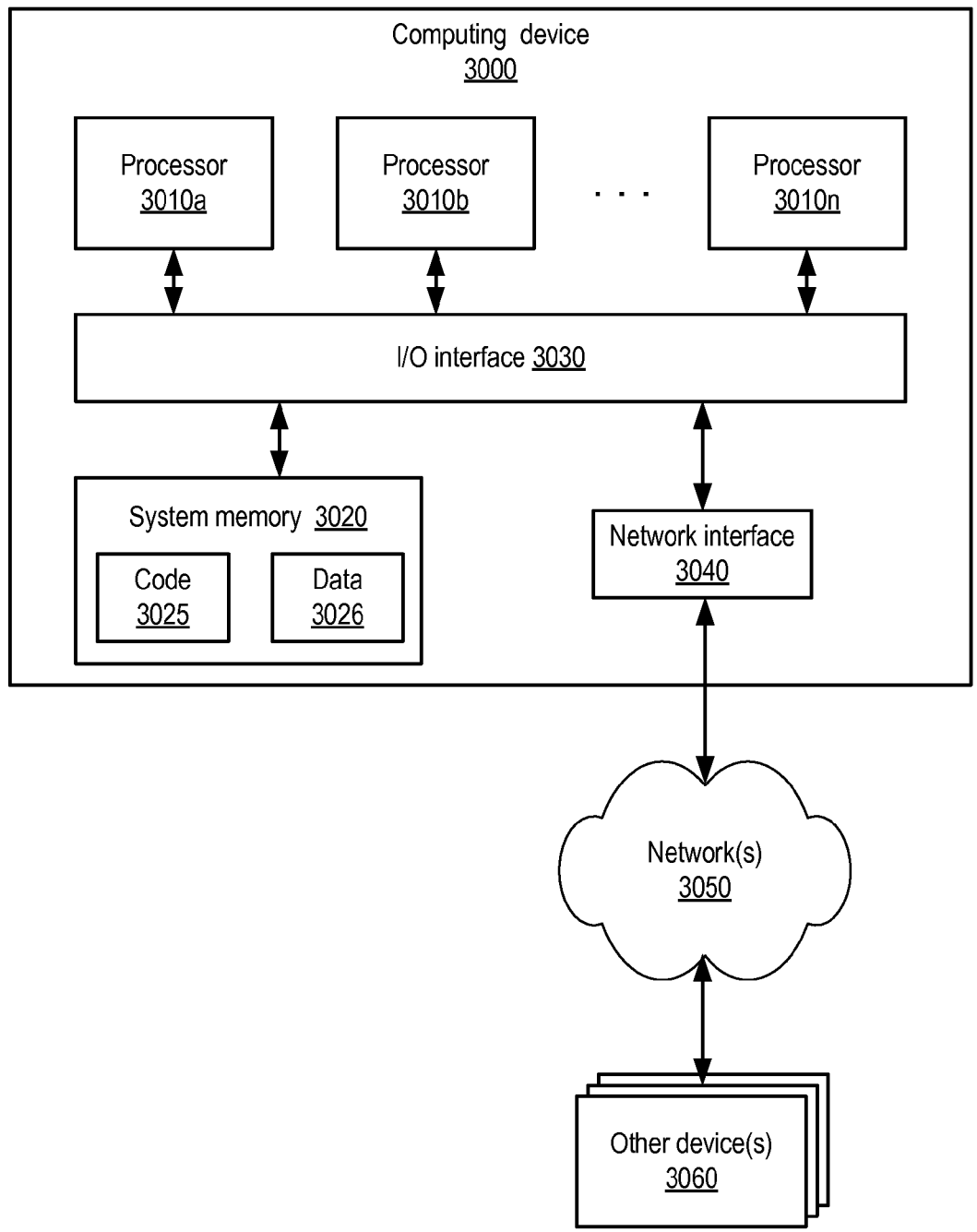
FIG. 7 is a block diagram illustrating an example computing device that may be used in at least some embodiments.

In at least some embodiments, a server that implements a portion or all of one or more of the technologies described herein, including the techniques to implement the various components of the operating system service, may include a general-purpose computer system that includes or is configured to access one or more computer-accessible media. FIG. 7 illustrates such a general-purpose computing device 3000. In the illustrated embodiment, computing device 3000 includes one or more processors 3010 coupled to a system memory 3020 (which may comprise both non-volatile and volatile memory modules) via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In at least some embodiments, the system memory 3020 may comprise both volatile and non-volatile portions; in other embodiments, only volatile memory may be used. In various embodiments, the volatile portion of system memory 3020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 6, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 6 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to:
determine that a particular program is to be executed at a distributed computing platform that implements a set of operating system interfaces using resources of a plurality of network-accessible services of a provider network;
identify one or more compute instances of a computing service of the plurality of network-accessible services at which to schedule a set of operations of at least a particular thread of execution of the particular program, wherein the set of operations includes an invocation of a storage-related operating system interface and an invocation of a networking-related operating system interface;
initiate an execution of the set of operations at the one or more compute instances;
perform, corresponding to the invocation of the storage-related operating system interface, at least one storage operation at a selected storage location at a storage service of the plurality of network-accessible services;
perform, using a networking device of the provider network assigned to the particular program, at least one network transfer corresponding to the invocation of the networking-related operating system interface; and
determine an overall result of execution of the particular program based at least in part of respective results of the at least one storage operation and the at least one network transfer.

2. The system as recited in claim 1, wherein to initiate the execution of the set of operations, the one or more computing devices are further configured to load an executable version of the particular program from a different storage location of the storage service into one or more memories accessible from the one or more compute instances.

3. The system as recited in claim 1, wherein to determine that the particular program is to be executed at the distributed computing platform, the one or more computing devices are further configure to receive a request to compile the particular program for the distributed computing platform.

4. The system as recited in claim 1, wherein the one or more compute instances comprise a first compute instance and a second compute instance, wherein the one or more computing devices are further configured to:
identify a portion of a memory of the first compute instance at which, in response to an invocation of a memory management-related operating system interface in the particular program, a memory object is instantiated; and
implement a concurrency control mechanism to coordinate access to the memory object from a respective first thread of execution of the particular program and a second thread of execution of the particular program, wherein operations of the first thread are executed at the first compute instance, and operations of the second thread are executed at the second compute instance.

5. The system as recited in claim 1, wherein the one or more computing devices are further configured to:
   determine, in accordance with a scaling policy associated with the particular program, that additional computing resources are to be deployed to execute the particular program; and
   configure at least one additional compute instance of the computing service to execute at least a portion of the particular program.

6. A method, comprising:
   performing, by one or more computing devices:
      determining that a particular program is to be executed at a distributed computing platform that implements a set of operating system interfaces using resources of one or more network-accessible services of a provider network;
      identifying one or more compute instances of a computing service of the one or more network-accessible services at which to schedule a set of operations of at least a particular thread of execution of the particular program, wherein the set of operations includes an invocation of an operating system interface;
      initiating execution of the set of operations at the one or more compute instances;
      performing, corresponding to the invocation of the operating system interface, at least one operation at a particular service of the one or more network-accessible services;
      determining an overall result of execution of the particular program based at least in part of results of the at least one operation.

7. The method as recited in claim 6, further comprising performing, by the one or more computing devices:
   initiating, using a networking device accessible from the one or more compute instances, at least one network transfer corresponding to an invocation of a networking-related operating system interface by the particular program.

8. The method as recited in claim 6, wherein the one or more compute instances comprise a first instance and a second instance, further comprising performing, by the one or more computing devices:
   assigning, for network transfers associated with the particular program, a network address;
   configuring the first instance to (a) receive network traffic directed to the network address and (b) indicate the network address as a source address for outbound network traffic generated by operations of the particular program that are executed at the first instance; and
   configuring the second instance to (a) receive network traffic directed to the network address and (b) indicate the network address as a source address for outbound network traffic generated by operations of the particular program that are executed at the second instance.

9. The method as recited in claim 6, wherein the one or more network-accessible services comprise a storage service, further comprising performing, by the one or more computing devices:
   loading an executable version of the particular program from a particular storage location of the storage service into one or more memories accessible from the one or more compute instances.

10. The method as recited in claim 6, wherein said determining that the particular program is to be executed at the distributed computing platform comprises receiving a request to compile the particular program for the distributed computing platform.

11. The method as recited in claim 6, wherein the set of operations comprises a plurality of operating system calls, wherein said determining that the particular program is to be executed at the distributed computing platform comprises verifying that the plurality of operating system calls are compliant with an operating system interface standard.

12. The method as recited in claim 6, wherein the one or more compute instances comprise a first compute instance and a second compute instance, further comprising performing, by the one or more computing devices:
   identifying a portion of a memory of the first compute instance at which, in response to an invocation of a memory management-related operating system interface in the particular program, a memory object is instantiated; and
   synchronizing, using a locking mechanism, access to the memory object from a respective first thread of execution of the particular program and a second thread of execution of the particular program, wherein operations of the first thread are executed at the first compute instance, and operations of the second thread are executed at the second compute instance.

13. The method as recited in claim 6, wherein the one or more compute instances comprise a first compute instance and a second compute instance, wherein operations of a first thread of the particular program are executed at the first compute instance, wherein operations of a second thread of the particular compute instance are executed at the second compute instance, further comprising performing, by the one or more computing devices:
   implementing a non-locking concurrency control mechanism to coordinate operations directed from the first and second threads to a memory object instantiated in response to an invocation of a memory management-related operating system interface in the particular program.

14. The method as recited in claim 6, further comprising performing, by the one or more computing devices:
   receiving an indication of a resource selection policy associated with the particular program; and
   selecting, based at least in part on the resource selection policy, a set of resources to be used during execution of the particular program, wherein the set of resources includes the one or more compute instances.

15. The method as recited in claim 6, further comprising performing, by the one or more computing devices:
   determining, in accordance with a scaling policy configured for the particular program, that additional computing resources are to be deployed to execute the particular program; and
   configuring at least one additional compute instance of the computing service to execute at least a portion of the particular program.

16. The method as recited in claim 15, further comprising performing, by the one or more computing devices:
   receiving, via a programmatic interface, an indication of the scaling policy from a client, wherein the scaling policy includes a limit on resources to be assigned to the particular program; and
   determining that the limit on resources is not violated by the configuration of the at least one additional instance.

17. The method as recited in claim 15, further comprising performing, by the one or more computing devices:
pre-configuring a pool of one or more compute instances to be used for one or more programs executing at the distributed computing platform; and
selecting the additional compute instance from the pool.

18. The method as recited in claim 6, wherein said performing, corresponding to the invocation of the operating system interface, at least one operation at a particular service of the one or more network-accessible services comprises:
determining a particular level of a storage hierarchy at which to store an object modified by a write operation, wherein the storage hierarchy comprises a plurality of levels including (a) a volatile memory of a virtualization host at which the first compute instance is instantiated, (b) a persistent storage device of the virtualization host, (c) a storage node of a network-accessible storage service presenting a web services interface for storage operations, and (d) a network-accessible database service; and
storing the object at a storage location corresponding to the particular level of the storage hierarchy.

19. A non-transitory computer-accessible storage medium storing program instructions that when executed on one or more processors:
in response to a request to execute a particular program at a distributed computing platform implementing a set of operating system interfaces using resources of one or more network-accessible services of a provider network,
identify one or more compute instances of a computing service of the one or more network-accessible services at which to schedule a set of operations of at least a particular thread of execution of the particular program, wherein the set of operations includes an invocation of an operating system interface;
initiate, corresponding to the invocation of the operating system interface, at least one operation at a selected service of the one or more network-accessible services;
determine an overall result of execution of the particular program based at least in part of results of the at least one operation.

20. The non-transitory computer-accessible storage medium as recited in claim 19, wherein the set of operations comprises a plurality of operating system calls, wherein the instructions when executed at the one or more processors:
verify that the plurality of operating system calls are compliant with an operating system interface standard.

21. The non-transitory computer-accessible storage medium as recited in claim 19, wherein the one or more compute instances comprise a first compute instance and a second compute instance, wherein the instructions when executed at the one or more processors:
identify a portion of a memory of the first compute instance at which, in response to an invocation of a memory management-related operating system interface in the particular program, a memory object is instantiated; and
utilize a concurrency control mechanism to coordinate access to the memory object from a respective first thread of execution of the particular program and a second thread of execution of the particular program, wherein operations of the first thread are executed at the first compute instance, and operations of the second thread are executed at the second compute instance.

22. The non-transitory computer-accessible storage medium as recited in claim 19, wherein the instructions when executed at the one or more computing devices:
determine, in accordance with a scaling policy configured for the particular program, that additional computing resources are to be deployed to execute the particular program; and
configure at least one additional compute instance of the computing service to execute at least a portion of the particular program.

* * * * *